United States Patent [19]

Sugiura

[11] 4,408,318
[45] Oct. 4, 1983

[54] MAGNETIC SHEET MOUNTING DEVICE

[75] Inventor: Yutaka Sugiura, Chichibu, Japan

[73] Assignee: Canon Kabushiki Kaisha, Tokyo, Japan

[21] Appl. No.: 368,999

[22] Filed: Apr. 16, 1982

Related U.S. Application Data

[63] Continuation of Ser. No. 190,864, Filed as PCT JP79/00139, May 30, 1979, published as WO79/01162, Dec. 27, 1979, § 102(e) date, Jan. 17, 1980, abandoned.

[30] Foreign Application Priority Data

May 31, 1978 [JP] Japan ................................. 53-74521

[51] Int. Cl.³ .............................................. G11B 3/62
[52] U.S. Cl. ..................................... 369/261; 369/270
[58] Field of Search .......................... 369/261, 270, 77

[56] References Cited

U.S. PATENT DOCUMENTS 3,768,815 10/1973 Mathurin ............................ 369/261
3,898,814  8/1975 Chou et al. ..................... 369/261 X

FOREIGN PATENT DOCUMENTS 51-32414   8/1976 Japan .
51-101117  8/1976 Japan .
52-7610    1/1977 Japan .
53-161608 12/1978 Japan .

Primary Examiner—Harry N. Haroian
Attorney, Agent, or Firm—Fitzpatrick, Cella, Harper & Scinto

[57] ABSTRACT

This specification discloses a leaf member pressing device used for a floppy disc or the like as an external memory device used in an information processing apparatus or the like. The damage of the disc which is liable to take place when a leaf member is pressed to a predetermined portion by a pressing member is prevented by a simple construction. In the present invention, the leaf member (11) is guided to a predetermined position by a guide member (18) to accurately fix the leaf member at a predetermined position, and then the leaf member is pressed by a pressing member (17).

8 Claims, 5 Drawing Figures

MAGNETIC SHEET MOUNTING DEVICE

This is a continuation, of application Ser. No. 190,864, filed as PCT JP79/00139, May 30, 1979, published as WO79/01162, Dec. 27, 1979, § 102(e) date, Jan. 17, 1980, now abandoned.

TECHNICAL FIELD

This invention relates to a leaf member pressing device for accurately fixing a leaf member at a predetermined position and for preventing the leaf member, for example, a magnetic recording sheet, from being damaged.

BACKGROUND ART

There is a floppy disc device as an external memory device used in an information processing apparatus such as a computer or the like. This floppy disc device uses a magnetic sheet as the recording medium. The magnetic sheet is called a disc, which is formed by a polyester substrate coated with a magnetic material and abounds in flexibility. Usually, the disc is contained in a jacket and this is called a floppy disc or a disket. An example of the prior art for mounting the disc on the floppy disc device is shown in FIGS. 1 and 2 (cross-sectional views) of the accompanying drawings. In FIG. 1, the disc 1 is positioned as shown relative to a rotary shaft 2 by inserting the disket (not shown) leftwardly (or rightwardly), but in this state the center 1a of the aperture portion of the disc and the center of rotation 2a of the rotary shaft are only roughly positioned and usually are not coincident with each other. Next, when a flange 3 is urged in the direction of arrow 4, a keep member 8 is lowered through a spring 5a, a bearing 6, a tapered piece 7 and a spring 5b. At this time, the keep member 8 depresses a pin 9a, so that a guide member 9 is also lowered along a guide bar 10. Therefore, the keep member 8 fits in the aperture portion of the disc 1. The disc 1 is held between the rotary shaft 2 and the flange portion 8a of the keep member 8. Next, when the flange 8a is further urged in the direction of arrow 4 as shown in FIG. 2, the spring 5b flexes to lower the tapered piece 7 and the tapered portions 6a and 7a of the tapered piece 7 are brought into contact with the inner surface of the keep member 8 to laterally widen the outer peripheral portion of the keep member 8 (the outer peripheral portion of the keep member 8 including the flange portion 8a is provided with a cut-away so that the outer peripheral portion of the keep member is laterally widened). At this time, the center 1a of the aperture portion of the disc 1 is corrected so as to be substantially coincident with the center 2a of the rotary shaft 2. However, in such a device of the prior art, the disc 1 in its state of being held between the rotary shaft 2 and the flange portion 8a of the keep member as mentioned previously is forcibly moved and therefore, wear tends to occur because of the disc 1 slipping relative to the rotary shaft 2. Also, when the slip can hardly take place (namely, when the frictional resistance is great), the aperture portion of the disc 1 may be damaged by the keep member 8. Accordingly, the aperture side of the disc 1 and the peripheral portion thereof are remarkably injured in proportion to the frequency of the above-described operation (mounting of the disket). The disc has an area in which recording and reproduction of information is effected (hereinafter referred to as the tracks), and the position of these tracks is displaced by the damage of the aperture portion of the disc, thus hampering the recording and reproduction of the information. When the aperture portion of the disc is so damaged, the disc becomes actually unusable due to the unsatisfactory positional accuracy of the tracks even if the magnetic surface of the disc is sufficiently usable.

It is therefore a first object of the present invention to accurately fix a leaf member at a predetermined position.

It is a second object of the present invention to prevent the leaf member from being damaged and to increase the life of the leaf member.

It is a third object to achieve the first and second objects by a simple construction and to suppress the rise of the manufacturing cost.

DISCLOSURE OF INVENTION

The pressing member of the leaf member pressing device according to the present invention is provided with an enlarging portion and after this enlarging portion has made the center of the aperture portion of a leaf member substantially coincident with the center of a shaft member, the pressing member presses the leaf member against the shaft member, thus preventing the leaf member from bearing against the enlarging portion and being damaged thereby and moreover, accurately fixing the leaf member at a predetermined position. Furthermore, such effects may be achieved by a simple construction.

The invention will become more fully apparent from the following detailed description thereof taken in conjunction with the accompanying drawings.

DESCRIPTION OF THE PREFERRED EMBODIMENT

To describe the present invention more in detail, embodiments thereof will be described with reference to the accompanying drawings.

Figure 1:
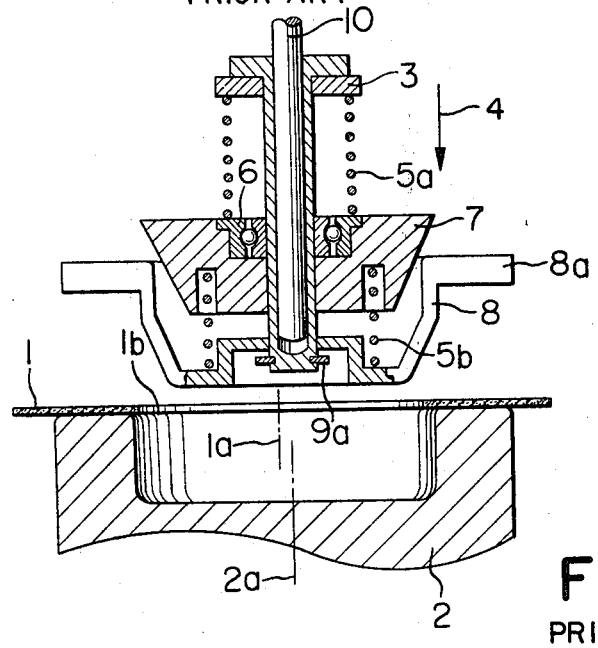
FIG. 1 is a cross-sectional view of a leaf member pressing device of the prior art showing the device before the disc is pressed against the rotary shaft.
Figure 2:
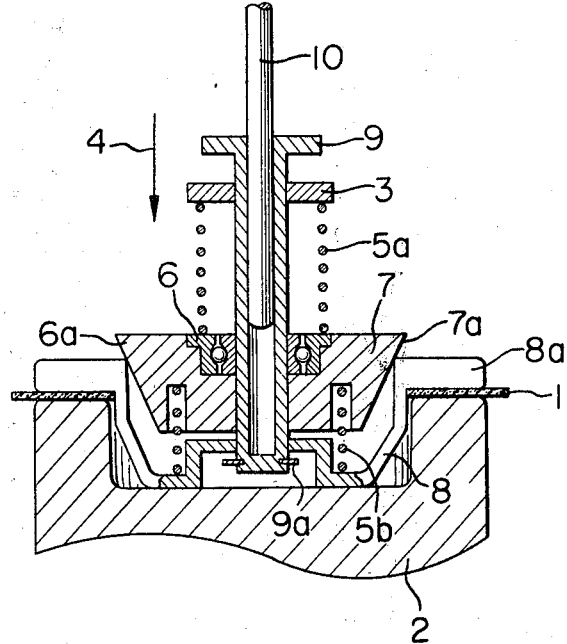
FIG. 2 is a cross-sectional view of the same device showing the device when the disc is pressed against the rotary shaft in FIG. 1.
Figure 3:
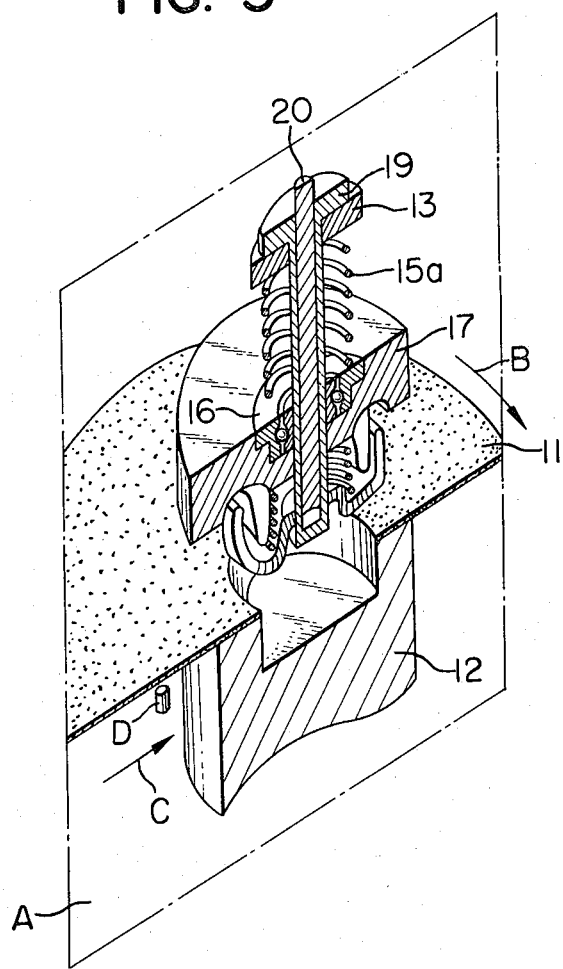
FIG. 3 is a perspective view of the leaf member pressing device according to the present invention taken along a plane A.

FIG. 3 is a perspective view of the leaf member pressing device of the present invention taken along a plane A. In FIG. 3, a disc 11 e.g., a magnetic recording sheet is rotatable in the direction of arrow B by the rotation of a rotary shaft 12 and recording and reproduction of information is effected on the surface of the disc by a magnetic head D which is movable in the direction of arrow C.

Figure 4:
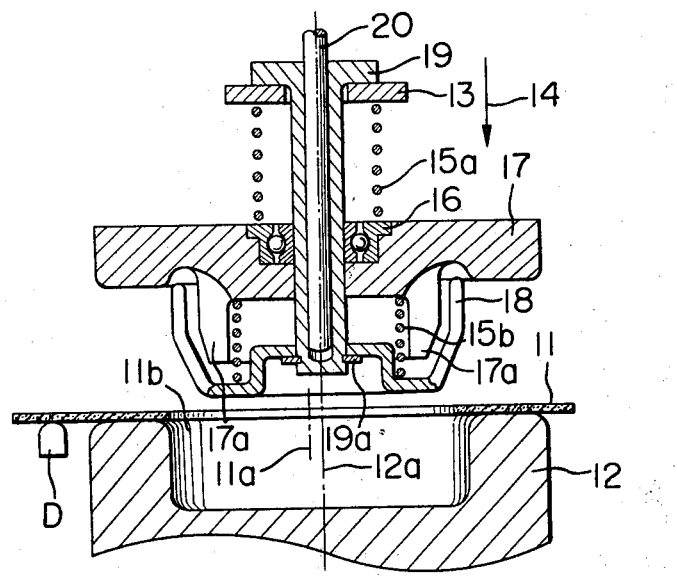
FIG. 4 is a cross-sectional view of the same device taken on the plane A in FIG. 3 and showing the device before the disc is pressed against the rotary shaft.

FIG. 4 is a cross-sectional view taken along the plane A in FIG. 3 and showing the device before the disc 11 is pressed against the rotary shaft 12. In FIG. 4, when a disket (a disc 11 contained in an unshown jacket as previously described) is inserted leftwardly (or rightwardly), the disc 11 is restricted in position by the configuration of the jacket (not shown) and is placed at the position as shown. In this state, the center 11a of the aperture of the disc 11 and the center of rotation 12a of the rotary shaft 12 are only roughly positioned and usually are not aligned with each other. (In this point, the present embodiment is similar to the example of the prior art described above.) Next, when a flange 18 is urged in the direction of arrow 14 by an unshown mechanism, a projected member 18 is lowered through a spring 15a, a bearing 16, a keep member 17 and a spring 15b. At this time, the projected member 18 depresses a pin 19a, so that a guide member 19 is also lowered along a guide bar 20 (the center of the guide bar 20 is provided so as to be coincident with the center of the rotary shaft 12).

Figure 5:
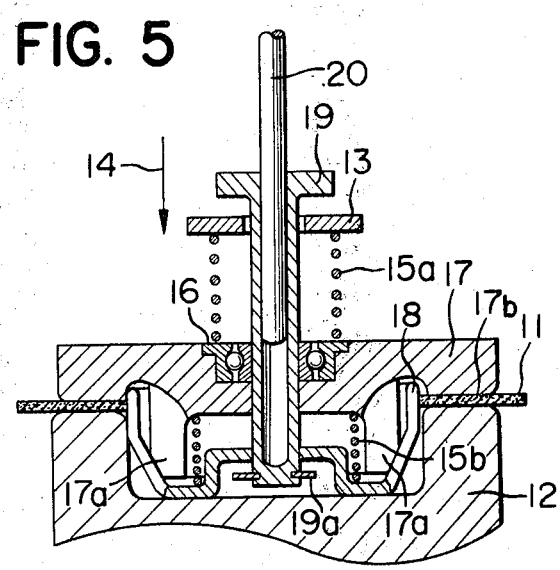
FIG. 5 is a cross-sectional view of the same device showing the device when the disc is pressed against the rotary shaft in FIG. 4.

Therefore, the projected member 18 fits in the aperture 11b of the disc 11 (leaf member). There is a tapered portion 17a near the lower end of the keep member 17, and this tapered portion 17a is lowered with the keep member 17 to thereby laterally widen the projected member 18 from the inside thereof. Since a cut-away is provided in the outer peripheral portion of the projected member 18, the outer peripheral portion of the projected member 18 is widened into contact with the aperture portion 11b of the disc 11 throughout the entire periphery thereof. In this manner, the center 11a of the aperture portion of the disc 11 is corrected so as to be substantially coincident with the center of rotation 12a of the rotary shaft 12. Next, when a flange 13 is forced in the direction of arrow 14 as shown in FIG. 5, the spring 15b is further flexed and the flange portion 17b of the keep member 17 urges the disc 11 against the rotary shaft 12. At this time, the tapered portion 17a is inwardly squeezed due to the cut-away provided therein and the outer peripheral portion of the projected member 18 is not widened. Thus, in the leaf member pressing device of the present invention, the disc 11 is pressed after the centers 11a and 12a have been substantially aligned with each other and therefore, any excess force is not exerted on the aperture portion 11b of the disc 11 and on the peripheral portion thereof. Thus, the aperture portion of the disc 11 is not damaged and therefore, the positional accuracy of the tracks formed on the disc is not reduced and this necessarily leads to a longer life of the disket. Although the leaf member pressing device of the present invention has the features as described above, the number of parts forming it remains unchanged as compared with the prior art and the manufacturing cost thereof is not increased.

I claim:

1. A recording sheet mounting device, comprising:
a shaft member having a recess adjacent to the center thereof, for supporting a recording sheet having an aperture;
a first projection member having a first projection engageable with said recess and adapted to engage with the aperture of the recording sheet, said first projection having at least one cut-away portion to facilitate enlargement of the diameter thereof;
a second projection member having a second projection for acting on an inside portion of said first projection member to thereby enlarge same when the center of the aperture of the recording sheet and the center of said shaft member do not substantially coincide, said second projection being deformable to achieve a decrease in the diameter thereof in response to a force applied thereto by said first projection member when the center of the aperture of the recording sheet and the center of said shaft member substantially coincide; and
an urging member, integral with said second projection member, for urging the recording sheet to said shaft member when the diameter of said second projection decreases.

2. A device according to claim 1, wherein said second projection member is formed with at least one cut-away portion.

3. A device according to claim 1, wherein said urging member urges a disk-shaped recording sheet to said shaft member, and said shaft member rotates said urging member and the recording sheet.

4. A device according to claim 1, wherein said second projection member is integrally formed within said urging member.

5. A recording sheet mounting device comprising:
a shaft member having a recess adjacent to the center thereof, for supporting a recording sheet having an aperture;
an opposing shaft coaxial with said shaft member;
a first projection member movable along said opposing shaft and having a first projection engagable with said recess and adapted to engage with the aperture of the recording sheet, said first projection having at least one cut-away portion to facilitate enlargement of the diameter thereof;
a second projection member having a second projection for acting on an inside portion of said first projection member to thereby enlarge same when the center of the aperture of the recording sheet and the center of said shaft member do not substantially coincide, said second projection being deformable to achieve a decrease in the diameter thereof in response to a force applied thereto by said first projection member when the center of the aperture of the recording sheet and the center of said shaft member substantially coincide; and
an urging member, integral with said second projection member, for urging the recording sheet to said shaft member when the diameter of said second projection decreases.

6. A device according to claim 5, wherein said urging member urges a disk-shaped recording sheet to said shaft member, and said shaft member rotates said urging member and the recording sheet.

7. A device according to claim 5, wherein said second projection member is integrally formed within said urging member.

8. A device according to claim 5, wherein said second projection member is formed with at least one cut-away portion.

* * * * *